Dec. 10, 1957 R. G. VANCE 2,815,878
ROLL HANDLING MECHANISM FOR AN INDUSTRIAL TRUCK
Filed May 24, 1955 3 Sheets-Sheet 2

INVENTOR.
ROBERT G. VANCE
BY
Golrick & Golrick
ATTORNEYS

United States Patent Office 2,815,878
Patented Dec. 10, 1957

2,815,878

ROLL HANDLING MECHANISM FOR AN INDUSTRIAL TRUCK

Robert G. Vance, Solon, Ohio, assignor to The Elwell-Parker Electric Company, Cleveland, Ohio, a corporation of Ohio Application May 24, 1955, Serial No. 510,774

5 Claims. (Cl. 214—652)

The present invention relates generally to an industrial truck adapted to manipulate cylindrical objects such as units of material in roll form, and specifically to a roll clamping device which will enable a lift truck to clamp, raise and lower, and by angular or rotational displacement change the situs of the axis of heavy cylindrical objects such as paper stock rolls with great flexibility of operation.

Several types of roll handling apparatus have been incorporated in industrial trucks of the prior art, some including a vertically elevatable carriage with simple jaws, one at least being reciprocable or pivoted and swingable relative to the other, some with plural movable jaws included as elements of one simultaneously moved and powered linkage system. All these prior structures have been burdened with disadvantages such as limited range of roll sizes which could be handled, or where a reasonable size range could be handled, either the complexity and space requirements of the jaw and actuating system, or the necessity of a manual adjustment of the clamping system by the operator to change the clamp capacity range.

The load handling mechanism of the present invention includes a new clamping device able to engage a wide range of roll diameters without manual adjustments; and with a rotating unit for mounting the clamp to the elevatable carriage of an industrial truck, say of the tier-lift type, there is provided in effect a vehicular tool, which is highly desirable and efficient for use in conjunction particularly with the operation of certain fabricating machines processing material such as paper or the like from roll stock. A truck so equipped is adapted not only to the ordinary manipulation of rolls performed by prior trucks, involving the pick-up and transport or rolls delivered to a factory, say from railway car to storage with possible incidental shift from horizontal to upright position, tiering at a storage depot, and subsequent withdrawal from storage to a processing machine; but also, by the compactness of the present clamping mechanism and its aptitude for engaging smaller diameters corresponding to partially used rolls as well as full sized rolls of its design capacity, is adapted to inserting and removing such diminished rolls at various dispositions in the process equipment.

It is then the general object of the present invention to provide on an industrial lift truck a roll manipulating mechanism of great operational flexibility. Another and more specific object is the provision of a hydraulically actuated roll clamping device for industrial trucks capable of handling a wider variation in roll sizes while maintaining simpler, and more compact structure than has been practical with prior structures of like capacity.

Other objects and advantages will appear from the following description and the drawings, wherein.

Figure 1:
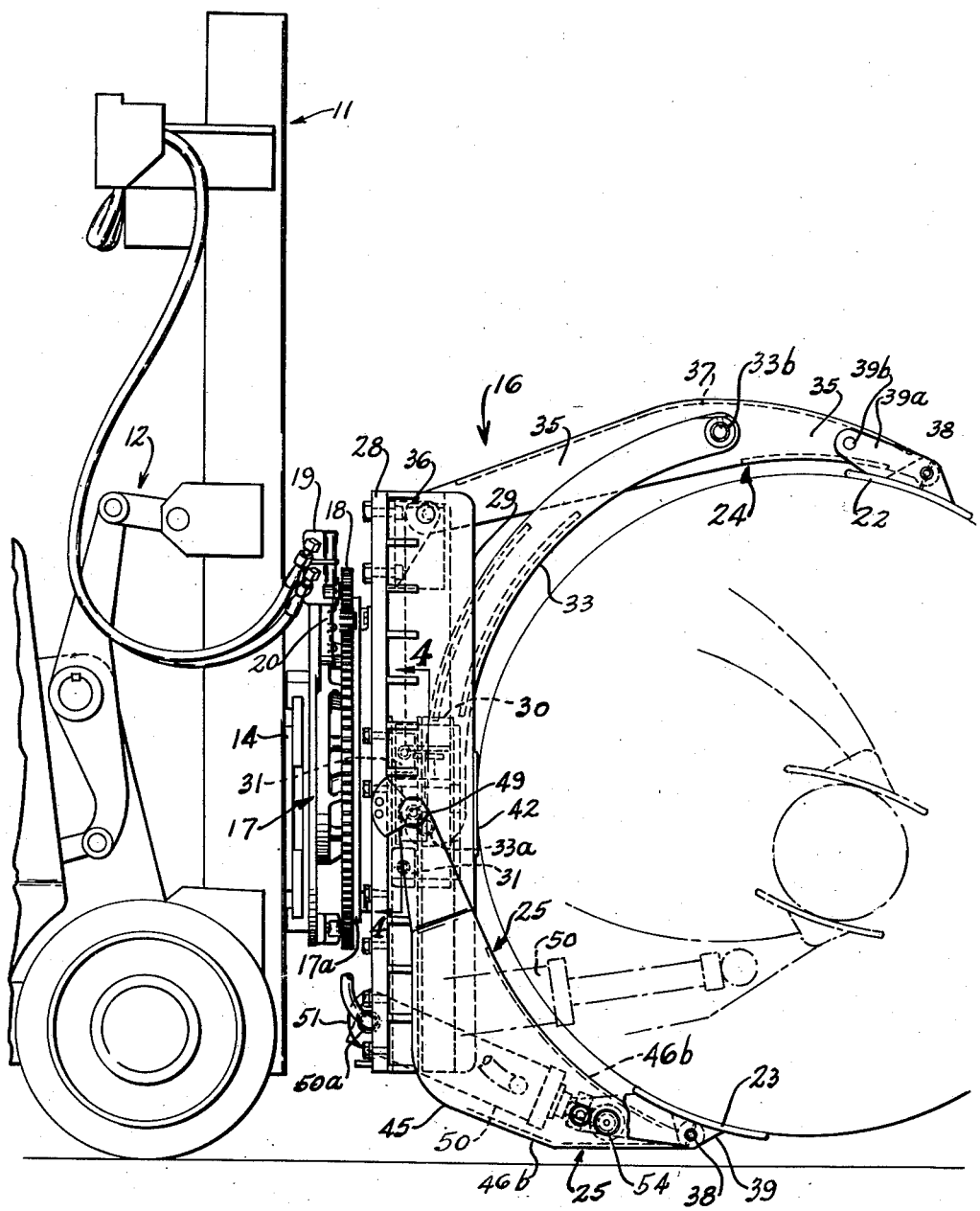
Fig. 1 shows the roll manipulating mechanism on a tier lift industrial truck viewed from one side, with clamping jaws open as for engaging and clamping a roll with axis horizontally transversely disposed.
Figure 2:
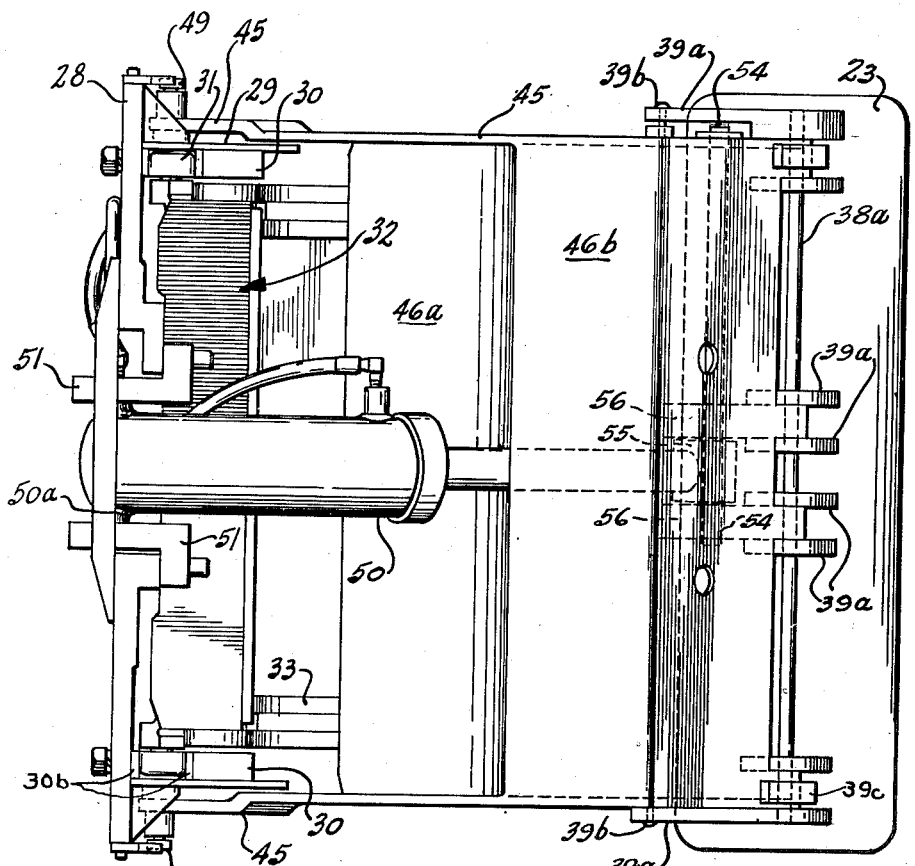
Fig. 2 shows the clamping mechanism closed and rotated ninety degrees from the position of Fig. 1.
Figure 4:
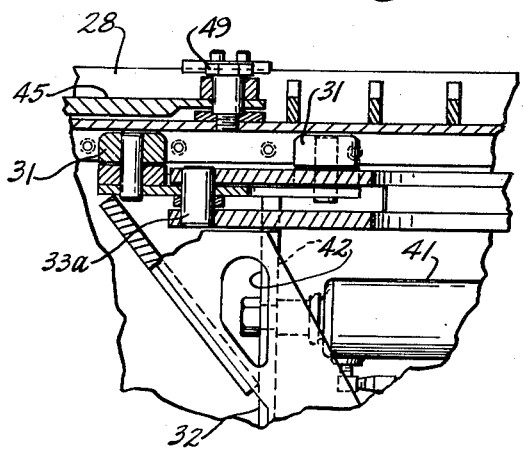
Fig. 4 is a fragmentary detail view with certain parts broken away showing the slidable mounting of a cross head element to the clamp base.
Figure 3:
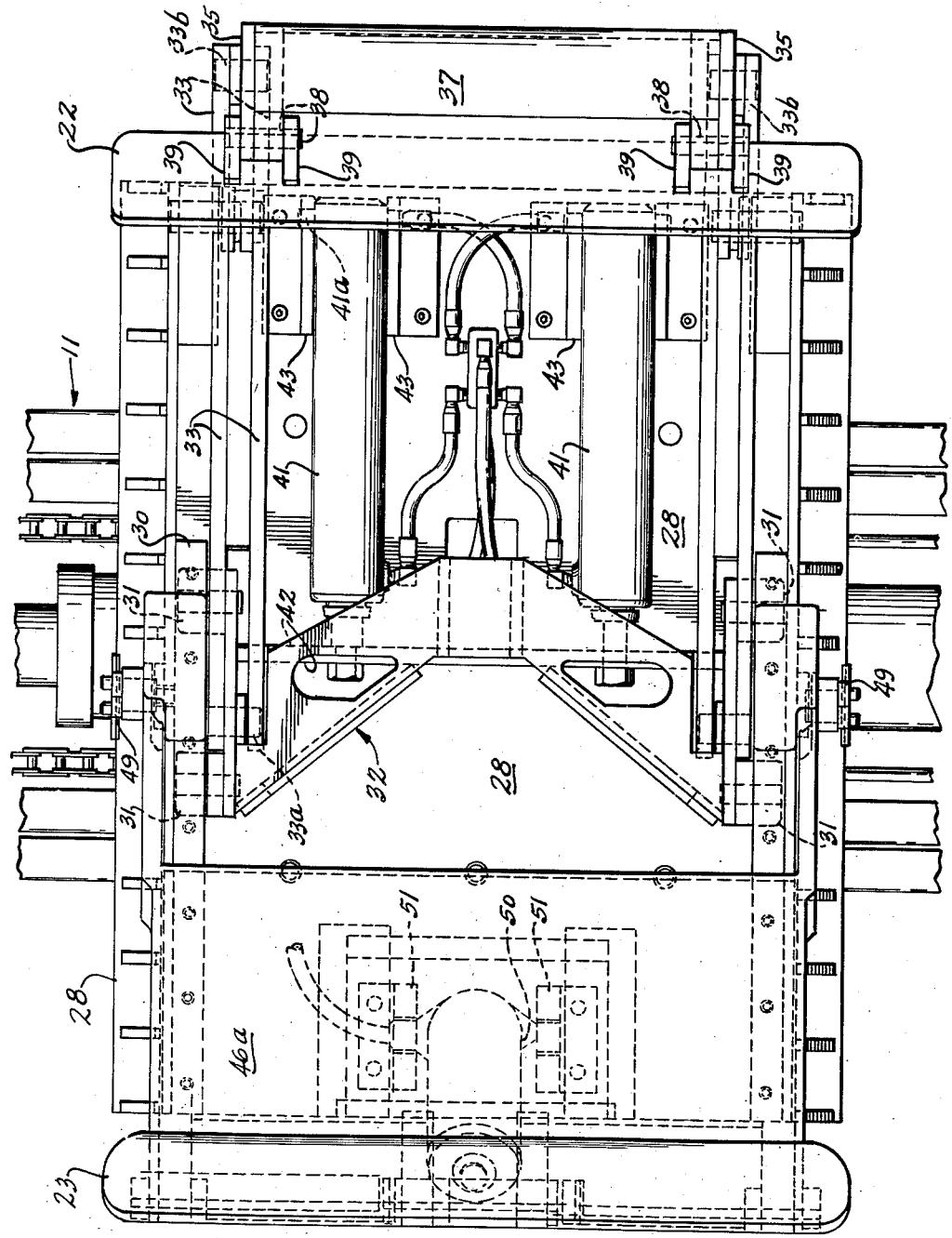
Fig. 3 is an end view of the clamping mechanism looking into the jaw opening.

In Fig. 1 the clamp of this invention is shown incorporated in a tier lift type industrial truck including a four-wheel self-propelled dirigible vehicle, designated by the general reference numeral 10, carrying at one end an upright elevator frame 11 pivotally mounted near its bottom to the chassis of the vehicle to be tilted forward and backward by a powered tilting mechanism and linkage 12. Spaced parallel channel members joined near top and bottom by spacer members into an open rectangular frame with the flanged sides of the channel facing each other, form the elevator frame 11, wherein an elevator carriage 14, having pairs of wheels on opposite sides running between flanges of the channel as tracks, is vertically movable to provide an elevator structure on the truck. A roll clamping device 16 is mounted on the carriage for rotation about an axis normally horizontal and longitudinal of the vehicle through a power driven turntable mechanism 17 which is rotatable through at least 90° and preferably a full 360° range.

The vehicle itself, the elevator structure and turntable may be any of several types well known to the prior art. Thus the vehicle may be operated by internal combustion or electric motor power means; the elevator structure tilting mechanism may be mechanically or hydraulically operated; the elevator structure may include a telescoping or non-telescoping frame structure and mechanical or hydraulic cylinder means for raising the carriage and associated elements; and the turntable may be hydraulically mechanically actuated. Accordingly the control means provided at the operator's station for the several functions of the truck are adapted to the particular means used for actuating the above elements.

Since the clamp device 16 hereinafter described is hydraulically actuated, the turntable, the frame tilt and carriage elevator systems of the truck may then well be hydraulically actuated, and accordingly a suitable hydraulic pump, reservoir and controls are provided on the vehicle proper, as well as suitable flexible conduits or swivel connections.

The clamp 16 is mounted on the turntable rotatable member 17a, which through the circumferential gear formation 18 thereon is driven by hydraulic motor 19 through a suitable speed reducing transmission unit 20 having a pinion meshing with the gear 18.

In the clamp 16 proper, two opposed movable gripping pads or shoes 22, 23, are mounted on hydraulically actuated jaw structures 24, 25 pivotally carried by a clamp base structure to be swung toward and away from each other about fixed parallel pivot axes respectively near one end and middle of the base. At the clamp base, there is a vertical back plate 28 secured to the rotatable element 17a and spaced parallel side plates 29 rigidly affixed edgewise and perpendicular to plate 28 near the edges of the latter, to support on the opposed inner side plate faces respective elongated track members 30 spaced from the back plate which therewith provide slideways or guide track channels receiving rollers or as here slide shoes 31 on the ends of a hydraulically reciprocated cross head 32. The cross head is connected to jaw 24 by link assemblies 33. Paired shims may be used as opposed facings in each slideway so formed providing bearing surfaces for the cross head.

The jaw 24 includes two like spaced endwise tapering curved members 35 each pivoted to the end of a corresponding one of the base side plates 29 at pivot 36, and joined by one or more transverse curved plates 37 into a single outwardly convex arm. At the free end of jaw 24, the curved clamping or gripping pad 22 is pivotally mounted by shaft means 38 passed through the end portions of plates 35 and the paired pivot brackets 39.

The curved link assemblies 33 are each pivoted at forked inner ends by shafts 33a to side portions of the cross head and at forked outer ends by pivot shafts 33b to the curved side members 35 near mid-length of the latter. Two mechanically and hydraulically parallel double acting hydraulic piston-cylinder units 41 move jaw 24. The piston rods of units 41 are connected to a transverse element 42 of the cross head and the opposite cylinder ends are secured between cylinder anchor brackets 43 on the back plate 28 by diametrically located cylinder studs 41a engaged in the bracket to power the jaw 24, so that the overall mounting of the unit relative to the disposition of the axis direction of the unit relative to the clamp base or frame thereby constraining such unit to act parallel to the clamp base. One of the studs on each unit also serves as a connection for a hose or fitting to the interior of the cylinder for passage of hydraulic fluid, another connection being provided near the opposite cylinder end.

The jaw structure 25 is generally similar to 24, though nearly L-shaped in end outline, and includes two spaced like side members 45 joined by transverse curved inner and outer plates 46a, b. On the tapered free end of the members 45, the curved contact or gripping shoe 23 is pivotally mounted by shafts and bracket plates 38, 39 similarly to shoe 22, while the opposite tapered ends of members 45 are pivoted on aligned fixed pivot studs or bolts 49 on the outer sides of members 29 of the clamp base.

One double acting hydraulic piston-cylinder unit 50 with opposite ends pivoted to the clamp base and jaw 25 serves to swing the latter in clamping motion. Spaced cylinder anchor brackets 51 are extended through a central opening near the end of back plate 28 to journal the diametrically aligned pivot or anchor studs 51a on the end of the cylinder, here again as in units 41 hydraulic connections to the cylinder interior being provided through a stud and the opposite end of the cylinder. The piston rod element of unit 50 is connected to the jaw 25 by a yoke structure including a threaded block 55 into which the rod end is screwed, which block is carried by a pivot shaft 54 located near the free end of the jaw and supported by internal central bracket plates 56. The end-face of cross-head 32 is tapered inwardly from each end to provide clearance for unit 50.

Relative to a center plane perpendicular to the back plate 28 and running parallel to and midway between the base side plates 29, the aforementioned elements are disposed in a symmetrical clamp structure and to that plane the several pivot axes are of course perpendicular. In the disclosed structure, the sliding shoes of the cross head may be pivoted on studs transverse to the slide direction for a self-aligning and adjusting action relative to the tracks. Separate two-way valves may be used in the lines between the hydraulic pump and reservoir on the truck and the cylinder units for jaws 24 and 25 respectively so that these jaws may be moved independently or simultaneously as desired. Each such valve at one operating position directs fluid under pressure from a pump to one end of the corresponding hydraulic unit, and from the other end of the unit to the reservoir, at a second position reversing such connection, while at a third or intermediate holding position blocks any flow relative to the unit to hold the corresponding jaw position. The short jaw 25 provided with such simple control is locatable at any contracted position desired by manual operation of the two-way valve therefor, and can be left at such position when a series of like size rolls is to be handled. The valve and line controlling advance of long jaw 24 may include a clamping pressure regulator, so that as the valve is left at clamping position, the jaw 24 not only moves inward to engage a roll between the two jaws, but also clamping pressure is continually applied to the corresponding side of units 41, a pressure responsive switch being used to control supply of fluid for the pressure in units 41.

Besides the pivot brackets at the end plate members of the jaw structures additional pivot bracket connections may be used at intermediate points between the jaws and pads. The outermost bracket plates 39 may have, as shown, an extension 39a at the end of which is an aperture alignable with an aperture in the side member 35 or 45, to receive a shoe locking pin 39b, permitting the clamping shoes to be locked against pivoting. When rolls are stowed so closely together in upright position that the ends of the jaws with clamping shoes cannot be fully inserted to embrace a roll first to be removed, the shoes may be immobilized on the jaws allowing the first roll to be "fished" out of position by engagement with the shoe edges alone.

In Fig. 1 the large circle between the expanded jaws and small circle between the jaws shown schematically in dashed outline for innermost position indicate the range of roll diameters which may be handled—from 51 inches to 12 inches in a typical case. The line of clamping pressure between the center of the gripping shoes, even for the smallest roll passes through the center of the roll cross section, so that there is no tendency of the roll to escape the shoes into the space between the jaw arms, a consequence of the pivoted swing of the jaws with contact pads toward each other. Stop projections 39c may be included on one or preferably both jaws fixed on the outer ends of the arm portions to bear on the back of the clamping shoes when handling small rolls and limit the pivoting of the shoes. The pivoted connection of the longer jaw arm 24 near one end of the base and location of the hydraulic units parallel to the base with the linkage of the cross head to the middle of the arm; and the pivoted connection of the shorter jaw arm 25 near the middle of the base with a hydraulic unit pivoted to the base and disposed generally within the confines of the outwardly extending portion of the arm 25 for a pivoted connection thereto, allow attainment of the above noted wide capacity of roll sizes while maintaining a relatively compact clamp structure meeting the space restrictions imposed by rotatable mounting on the elevatable carriage of a lift truck for the stated manipulations and uses.

I claim:

1. For use in an industrial lift truck of the roll manipulating type, having a vertically elevatable carriage, a roll clamping device, and a turntable mechanism mounting the clamping device to extend forward from the carriage for rotation about an axis normally longitudinal of the truck, a clamping device comprising: a base mounted on the turntable for rotation thereby and including slideway means on a forward face thereof; a cross head slideably engaged in said slideway means; double acting hydraulic piston and cylinder means mounted parallel to the slideway means and operatively conected between one end of the base and the cross head; a first jaw with one end hinged on said one end of the base and extending generally forwardly therefrom to swing about a pivot axis transverse to the direction of said slideway means; a linkage member with ends pivoted respectively to said cross head and to a locus intermediate the ends of said jaw to swing the jaw upon movement of the cross head; a second jaw with one end hinged to the base at a locus spaced inwardly from the other end of the base to swing about a pivot axis parallel to that of the first jaw, said second jaw structure being angularly shaped to extend from its hinge pivot parallel to the base length toward the other end of the base and then forwardly from the base when in retracted position; double acting hydraulic piston and cylinder means pivotally connected to the base at a locus intermediate said other end of the base and the hinge pivot of the second jaw and to the free end of the second jaw; and two opposed curved clamping shoes pivotally connected to the free ends of the jaws.

2. For use in an industrial lift truck of the roll manipulating type, having a vertically elevatable carriage, a roll clamping device, and a turntable mechanism mounting the clamping device to extend forward from the carriage for rotation about an axis normally longitudinal of the truck, a clamping device comprising: a base mounted on the turntable for rotation thereby and including spaced parallel trackways on a forward face thereof; a cross head having opposite ends engaged in said trackways; double acting hydraulic piston and cylinder means mounted parallel to the trackways and operatively connected between one end of the base and the cross head; a first jaw with one end hinged on said one end of the base and extending generally forwardly therefrom to swing about a pivot axis transverse to said trackways; a linkage member with ends pivoted respectively to said cross head and to a locus intermediate the ends of said jaw to swing the jaw upon sliding of the cross head; a second jaw with one end hinged to the base at a locus substantially mid-length of the base to swing about a pivot axis parallel to that of the first jaw, said second jaw structure being angularly shaped to extend from its hinge pivot parallel to the base length toward the other end of the base and then forwardly from the base when in retracted position; double acting hydraulic piston and cylinder means pivotally connected to the said other end of the base and to the free end of the second jaw; and two opposed curved clamping shoes pivotally connected to the free ends of the jaws.

3. For use in an industrial lift truck of the roll manipulating type, having a vertically elevatable carriage, a roll clamping device, and a turntable mechanism mounting the clamping device to extend forward of the carriage for rotation about an axis normally longitudinal of the truck, a clamping device comprising: a base mounted on the turntable for rotation thereby and including spaced parallel trackways on a forward face thereof; a cross head having opposite ends engaged in said trackways; double acting hydraulic piston and cylinder means mounted parallel to the trackways and operatively connected between one end of the base and the cross head; a first jaw structure including spaced parallel side plates each having corresponding ends hinged near said one end of the base at locations inward of the directions of said trackways and transverse member rigidly connecting the side plates; parallel linkage members each having its ends pivoted respectively to said cross head and to a corresponding side plate of the jaw at a locus intermediate the ends of said jaw; a second jaw structure including spaced angularly shaped parallel side plates each having one end hinged to the base outward of a corresponding trackway at a locus substantially mid-length of the base, said angularly shaped side plates being shaped to extend from its hinge pivot parallel to the trackways toward the other end of the base and then forwardly from the base when in retracted position, said second jaw structure also including a transverse member between the forwardly extending portions of the side plates rigidly connecting the latter; double acting hydraulic piston and cylinder means extending generally forwardly from the base and pivotally connected to the said other end of the base and to the free end of the second jaw structure; and two clamping shoes pivotally connected to the free ends of the jaw structures having opposed concavely curved roll clamping surfaces; the pivot axes of all pivoted and hinge connections being parallel whereby upon actuation of said hydraulic means the shoes may be swung toward and away from each other.

4. For use in an industrial lift truck of the roll manipulating type, having a vertically elevatable carriage, a roll clamping device, and a turntable mechanism mounting the clamping device to the carriage for rotation about an axis normally longitudinal of the truck; a clamping device adapted to clamp a wide range of roll diameters while maintaining a small clamp structure and comprising: a base mounted on the turntable transverse to the axis thereof for rotation thereby; first and second jaw structures carrying opposed roll clamping shoes, said jaw structures being pivotally connected at inner ends by parallel pivots respectively to one end of and to the middle portion of the base to swing the clamping shoes toward and away from each other in a space forward of the base; hydraulic actuating means for the first jaw structure including a hydraulic piston and cylinder unit mounted on the base, with direction of the axis of the unit fixed, to act parallel to the base and with one end fixed to the base and the other end reciprocable, said actuating means also including a link member connecting the reciprocable end of said unit to the first jaw structure at a locus intermediate the base and the clamping shoe thereof; and hydraulic actuating means for the second jaw structure with one end connected to the base at a point spaced from the pivot axis of the second jaw outwardly in a direction toward the other end of the base and with the other end connected at a point between the pivot axis of the second jaw and the clamping shoe thereon.

5. For use in an industrial lift truck of the roll manipulating type, having a vertically elevatable carriage, a roll clamping device, and a turntable mechanism mounting the clamping device to the carriage for rotation about an axis normally longitudinall of the truck; a clamping device adapted to clamp a wide range of roll diameters while maintaining a small clamp structure and comprising: a base mounted on the turntable transverse to the axis thereof for rotation thereby; first and second jaw structures carrying opposed roll clamping shoes, said jaw structures being pivotally connected at inner ends by parallel pivots respectively to one end of and to the middle portion of the base to swing the clamping shoes toward and away from each other in a space forward of the base; hydraulic actuating means for the first jaw structure including a hydraulic piston and cylinder unit mounted on the base with one end fixed to the base and the other end reciprocable, and also including guide means for the reciprocable end whereby said unit is constrained to act parallel to said base and a link member connecting the reciprocable end of said unit to the first jaw structure at a locus intermediate the base and the clamping shoe thereof; and hydraulic actuating means for the second jaw structure with one end connected to the base at a point spaced from the pivot axis of the second jaw outwardly in a direction toward the other end of the base and with the other end connected at a point between the pivot axis of the second jaw and the clamping shoe thereon.

References Cited in the file of this patent

UNITED STATES PATENTS

| | | |
|---|---|---|
| 2,497,118 | Ferrario et al. | Feb. 14, 1950 |
| 2,596,477 | Frischmann et al. | May 13, 1952 |
| 2,635,774 | Backofen et al. | Apr. 21, 1953 |
| 2,667,283 | MacDonald et al. | Jan. 26, 1954 |